UNITED STATES PATENT OFFICE.

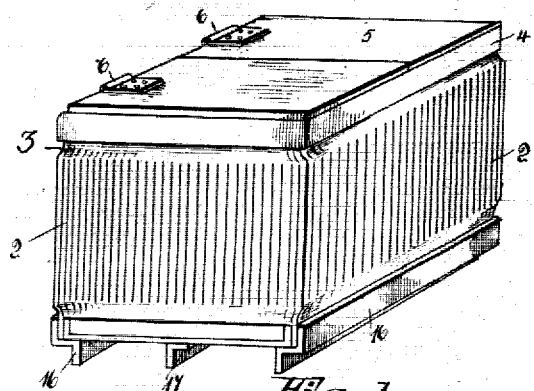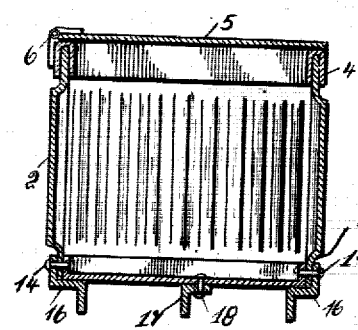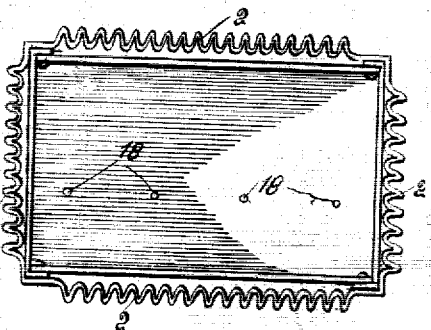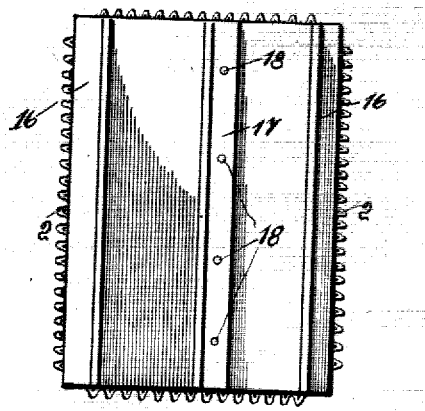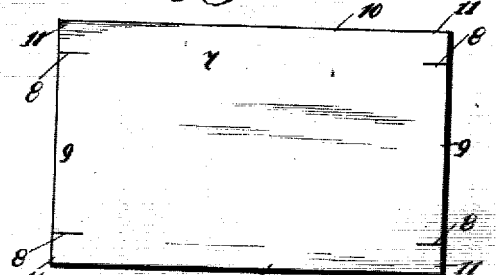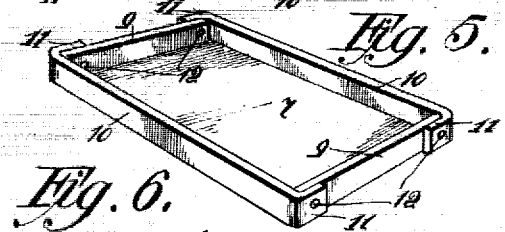

HENRY J. GERNER, OF VANDERGRIFT, PENNSYLVANIA.

BASKET.

No. 820,107.　　　Specification of Letters Patent.　　　Patented May 8, 1906.

Application filed December 16, 1904. Serial No. 237,142.

*To all whom it may concern:*

Be it known that I, HENRY J. GERNER, a citizen of the United States of America, residing at Vandergrift, in the county of Westmoreland and State of Pennsylvania, have invented certain new and useful Improvements in Baskets, of which the following is a specification, reference being had therein to the accompanying drawings.

This invention relates to certain new and useful improvements in baskets and the like receptacles.

The object of this invention is to provide a basket formed of sheet metal and having corrugated sides.

The primary object of this invention is to provide a basket which is particularly adapted for the shipment of bread and the like articles which will be of a sufficient strength and rigidity to withstand the rough usage to which shipping-baskets and the like receptacles are subjected.

Another object of my invention is to provide a metallic basket the sides of which will be corrugated whereby a more rigid and strong basket is procured. In constructing the baskets I have employed as few pieces as possible, whereby the expense of manufacture will be reduced to a minimum.

With the above and other objects in view reference will be had to the drawings accompanying this application, wherein like numerals of reference designate corresponding parts throughout the several views, in which—

Figure 1 is a perspective view of my improved basket. Fig. 2 is a transverse sectional view of the same. Fig. 3 is a horizontal sectional view of my improved basket. Fig. 4 is a bottom plan view of the basket. Fig. 5 is a plan view of the blank sheet of metal from which the bottom of my improved basket is formed, and Fig. 6 is a perspective view of the bottom of the basket as formed from the blank illustrated in Fig. 5 of the drawings.

To put my invention into practice, I employ a sheet of metal which I use to form the sides and ends of my improved basket, and this sheet of metal is adapted to be bent into the shape desired for the basket. In the accompanying drawings I have illustrated a basket which is rectangular in cross-section, and in this instance the sheet of metal, as designated by the reference-numeral 1, is bent to conform to this shape. Prior to bending the sheet of metal to the contour desired I provide the same with corrugations 2, which lie in close proximity to one another and are arranged vertically in respect to the longitudinal axis of the sheet of metal. In forming the sides and ends of my improved basket I desire to retain plane zones above and below the corrugations, whereby the top and bottom edges of the sides of the basket may be protected. In order to accomplish this, suitable rollers may be employed for producing the corrugated and plane zones of the sheet of metal, or a suitable stamping and pressing machine may be brought into use; but I do not care to confine myself to the exact manner in which I may manufacture the corrugated sheets of metal, as either of the above elements may be employed for producing the desired construction.

When the sheet of metal has been bent to conform to the desired shape of basket, I provide the upper plane zone 3 of the sheet of metal, which will be hereinafter termed the "top edges" of the basket, with a metallic binding 4. This metallic binding in cross-section is of a substantially U shape, and the binding may be made of a suitable piece of metal or channel-iron bent to fit around the top edges of the basket.

The reference-numeral 5 designates a lid or cover, which is preferably formed of sheet metal, this lid or cover being hinged, as indicated at 6, to the one side of the top edge of the basket. I do not care to confine myself to any specific form of lid or cover that may be used in connection with the body portion of my improved basket, and if it be desired this lid or cover may be made of one or more sections and suitable fastenings employed for securing the lids or covers in a closed position.

The bottom of my improved basket is formed from a metallic blank 7, which is sheared, as indicated at 8 8. The two ends 9 9 of the blank are bent upwardly at right angles to the body portion of the blank, and the sides 10 10 are bent upwardly similarly to the ends 9 9. The ends 11 11 of the sides 10 10 are then bent inwardly to engage the ends 9 9, forming a substantially pan-shape bottom. The ends 11 of the sides 10 are then secured to the ends 9 9 by rivets 12 12.

The bottom of the basket is now placed within the sides and ends formed of the sheet of metal 1 and rivets 14 employed for securing the sides 10 of the bottom and lower plane zone 15 of the sheet of metal 1 together, Prior to placing the rivets 14 in position to secure the bottom and the sides and ends of the basket together I provide the strips 16 16 for protecting the lower edges of the basket and supporting the same. These strips are in cross-section substantially Z shape, and they are adapted to be secured to the sides of the basket by the rivets 14, which secure the bottom, sides, and ends of the basket together. Another strip of metal 17 is secured to the bottom of the basket by rivets 18, this strip being arranged longitudinally of the basket, whereby it will support and add rigidity to the entire basket. The strips 16 and 17 serve two purposes—namely, to support the basket slightly above the floor or base which supports the same and to protect the lower edges of the basket. These strips will prevent the bottom of the basket from becoming distorted or injured, which might occur by placing the basket upon an irregular base.

It will be observed that it is necessary to provide the upper and lower plane zones upon the sheet 1 in order that the metallic binding 4 and the strips 16 16 may be secured to the sides and ends of the basket, and it will be apparent that a basket constructed in accordance with my invention will have a perfect ventilation, which oftentimes is essential in shipping-baskets and the like.

It will be noted that various changes may be made in the details of construction without departing from the general spirit and scope of the invention.

Having fully described my invention, what I claim, and desire to secure by Letters Patent, is—

1. As an article of manufacture, a metallic bread-basket, comprising side and end walls made from a single sheet of metal, having vertical corrugations and having plain uncorrugated portions at the upper and lower edges respectively, a bottom having an upturned flange fitting within the body, angle-strips having one flange engaging the uncorrugated lower edge of the sides and the other flange thereof extending below the bottom, and means securing the said angle-strips, the body and the bottom together, substantially as described.

2. As an article of manufacture, a metallic bread-basket, comprising a bottom having an upwardly-extending flange, supporting-strips engaging the bottom and having downwardly-extending flanges projecting below the bottom and having upwardly-extending flanges, and a body comprising side and end walls and having the lower edge of the side walls received between the upwardly-extending flanges of the bottom and supporting-strips respectively, and means for securing said flanges and side walls together.

3. As an article of manufacture, a metallic bread-basket comprising a substantially rectangular bottom provided with an upturned flange, a body of rectangular form having its lower end fitting over the flange of the bottom, supporting-strips having upwardly-projecting and downwardly-projecting flanges, the bottom resting on said supporting-strips, and the upwardly-projecting flanges thereof being secured to the body, and to the flange of the bottom.

4. As an article of manufacture, a metallic bread-basket comprising a bottom having an upturned flange, supporting-strips on which the bottom is seated and which have upwardly-projecting flanges, a body having the lower edge of its side walls received between the upwardly-projecting flanges of the bottom and the supporting-strips, respectively, and secured thereto, and a metallic binding on the upper edge of said body.

5. A metallic bread-basket composed of a corrugated body portion having plane zones at its lower edge, a bottom composed of a single sheet of metal having upturned sides and upturned ends overlapping and secured to the sides at their extremities, angle-bars having upwardly-extending flanges riveted to the sides of the body and to the sides of the bottom, said angle-bars extending under the bottom and serving to support the same.

In testimony whereof I affix my signature in the presence of two witnesses.

HENRY J. GERNER.

Witnesses:
W. L. J. PRUGH,
WM. J. GRIFFITHS.